Feb. 26, 1924.

P. M. MARKO

RADIO BATTERY CONSTRUCTION

Filed March 22, 1923

WITNESSES

INVENTOR
Paul M. Marko
BY
ATTORNEYS

Patented Feb. 26, 1924.

1,485,282

UNITED STATES PATENT OFFICE.

PAUL M. MARKO, OF BROOKLYN, NEW YORK.

RADIO BATTERY CONSTRUCTION.

Application filed March 22, 1923. Serial No. 626,881.

*To all whom it may concern:*

Be it known that I, PAUL M. MARKO, a citizen of the United States, and a resident of the city of New York, borough of Brooklyn, in the county of Kings and State of New York, have invented a new and Improved Radio Battery Construction, of which the following is a full, clear, and exact description.

This invention relates to a battery construction, preferably a radio battery, and has for an object the provision of means whereby leakage or creepage on the cover or cap of the battery will be so minimized as not to cause a short circuit.

Another object resides in the provision of a simple and economically manufactured cover plate for a battery which can be very readily applied thereto and removed therefrom.

The invention is illustrated in the drawings, of which—

Figure 2:
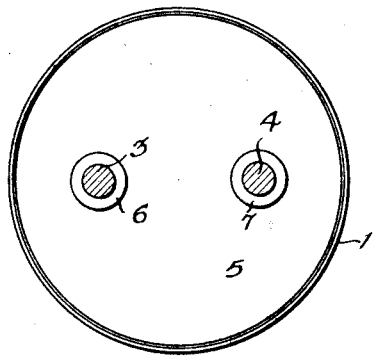
Fig. 2 is a plan view thereof.

The forms of the invention shown in the drawings are preferred forms, although it is understood that modifications in the construction and arrangement of the parts and in the character of the materials used may be adopted without departing from the spirit of the invention.

In producing radio batteries of the type in which the battery is small, sometimes in the form of one or more test tubes with the plates disposed therein in a suitable electrolyte, the cover of the battery takes the form of rubber stoppers or stoppers of some suitable insulating material. If an ordinary rubber stopper is used, it has generally been customary to extend the terminals or terminal posts of the battery through ports in the stopper to project above the same and be connected to the circuit. However, with the ordinary character of cover, of which the upper surface is practically flat, if there happens to be a slight leakage around the edges thereof or along the terminal posts, there is likely to be a creepage of the electrolyte, thereby causing short circuit through the liquid, readily capable of accumulating between the posts, because there is nothing to prevent the flow of the liquid across the top of the stopper or cover.

To prevent this possibility, I, therefore, provide means associated with the stopper or cover which will make the path necessary for leaking liquid to travel over considerably longer so that it will be next to impossible for a short circuit to be established.

Figure 1:
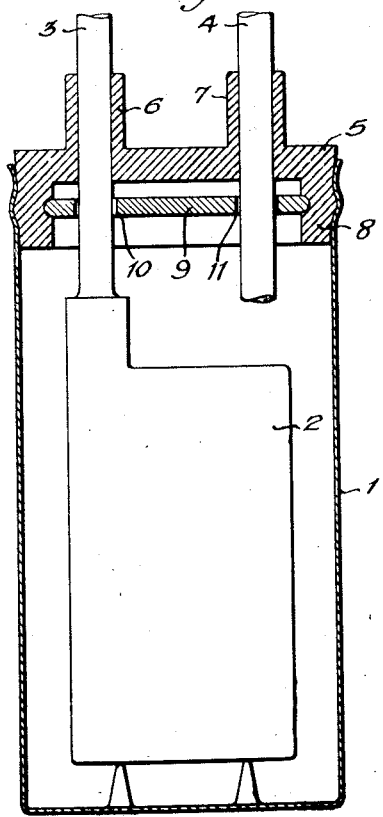
Figure 1 is a vertical longitudinal section through a form of battery.

To this end, I provide a construction such as illustrated in the drawings. The battery may be of any suitable form to enclose a battery container 1, which in one form of the battery is an ordinary glass test tube within which a plurality of plates such as 2 are contained. These plates are connected in any standard manner, and terminal posts such as 3 and 4 extend upwardly from the positive and negative plates through the cover or stopper 5. This stopper or cover plate 5 is made of insulating material, preferably rubber, and, because the container is glass, is made of rubber of some flexibility which can be inserted in the top of the container like an ordinary stopper, if desired. It has been found that leakage or creepage may occur along the surface of the terminal posts and that the liquid will reach the surface of the stopper and in so doing would be likely to extend to the other post and thereby establish a short circuit if the surface of the stopper is flat. However, by providing, as shown in Fig. 1, the upper surface of the stopper or cover 5 with a pair of projecting sleeves 6 and 7, one for each of the terminal posts 3 and 4, it will be seen that the metallic surface of the posts 3 and 4 do not come into view or are not exposed at any point near the normal surface of the stopper or cover 5, so that any liquid which may form on the surface could not possibly form a short circuit between the posts. These sleeves projecting from the upper surface of the stopper or cover 5 may be made of the same material as the stopper, in fact they may be molded therewith in the same process of manufacture. Preferably, the stopper is formed with a dependent flange 8 so as to make it somewhat cup shaped in form, and within the cup thereof there may be disposed a stiffening or strengthening plate 9, preferably made of harder rubber, which can be forced thereinto but which is provided with apertures 10 and 11 to permit the passage of the terminal posts 3 and 4.

Figure 4:
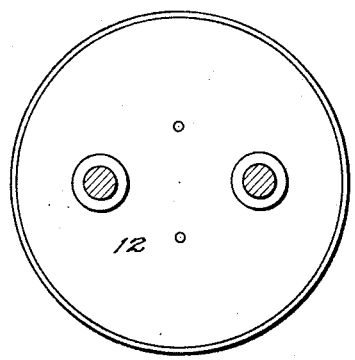
Fig. 4 is a plan view thereof.
Figure 3:
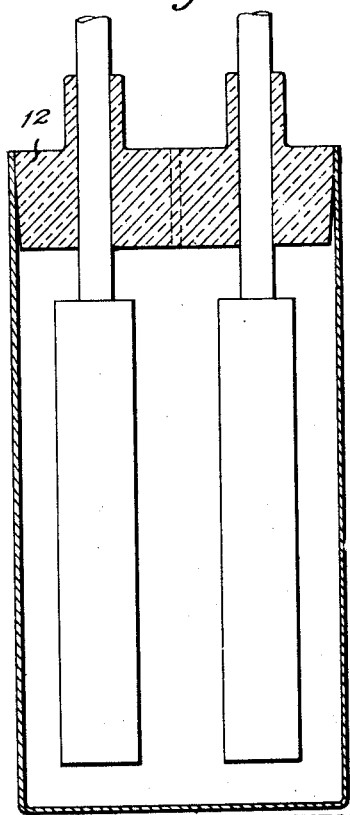
Fig. 3 is a vertical section through a modified form.

Figs. 3 and 4 are views of a stopper 11 which only differs from the one just described in that it is a slotted stopper or cover and is not provided with a cuplike recess and, consequently, in it the stiffening plate 9 is absent. In other respects the two forms of the invention are identical.

It will be seen, therefore, that my invention comprises providing the upper surface of a battery cover or plate through which terminal posts are to extend, and from the upper surface of which they are to project, with suitable sleeves formed on the upper surface thereof, preferably integral therewith, and surrounding the metal of the terminal posts up to a point substantially above the normal top surface of the cover or stopper, whereby the path over which liquid would have to flow to get from one post to another to form a short circuit is greatly increased.

It is to be particularly noted that the sleeves extending upwardly from the form of stopper or cover shown in Figure 3 are elongated and of thin walls, the same as shown in Figure 1. It is important that these sleeves be of a relatively great length in order to serve the purpose of this invention. The sleeves 6 and 7 should be of the length shown, or preferably of a greater length.

What I claim is:—

1. A storage battery construction which includes a cup-shaped cover of flexible insulating material, a strengthening plate of stiffer insulating material disposed within the cup of said plate, said cover plate and stiffened plate having apertures through which the terminal posts from the battery plates extend, and sleeves on the upper surface of the cover plate in alinement with the apertures therein to insulate the terminal posts for a considerable distance above the normal surface of the cover plate.

2. In a storage battery of the character described, a stopper or cover for the cell container of said battery, said stopper or cover being made of pliable material and having a plurality of spaced and elongated sleeves or nipples of the same material formed upon its upper or top surface, said sleeves or nipples having relatively thin walls and each sleeve registering with an opening extending longitudinally through the stopper or cover.

PAUL M. MARKO.